US009061337B2

(12) United States Patent
Schaaf et al.

(10) Patent No.: US 9,061,337 B2
(45) Date of Patent: Jun. 23, 2015

(54) METHOD FOR PRODUCING RECTANGULAR OR SQUARE WALL ELEMENTS FROM FLAT SHEET METAL, AND WALL ELEMENTS PRODUCED THEREWITH

(75) Inventors: Igor Harry Schaaf, Rheinmuenster (DE); Paul Mazura, Karlsbad (DE); Walter Nicolai, Buseck (DE); Simon Jocham, Munich (DE)

(73) Assignee: C E S CONTROL ENCLOSURE SYSTEMS GMBH, Bad Homburg V.d. Hoehe (DE)

( * ) Notice: Subject to any disclaimer, the term of this patent is extended or adjusted under 35 U.S.C. 154(b) by 0 days.

(21) Appl. No.: 14/001,501

(22) PCT Filed: Feb. 22, 2012

(86) PCT No.: PCT/EP2012/000766
§ 371 (c)(1),
(2), (4) Date: Oct. 23, 2013

(87) PCT Pub. No.: WO2012/113548
PCT Pub. Date: Aug. 30, 2012

(65) Prior Publication Data
US 2014/0150366 A1    Jun. 5, 2014

(30) Foreign Application Priority Data

| Feb. 25, 2011 | (DE) | .......................... | 10 2011 012 433 |
| Feb. 25, 2011 | (DE) | .......................... | 10 2011 012 434 |
| Feb. 25, 2011 | (DE) | .......................... | 10 2011 012 435 |
| Feb. 25, 2011 | (DE) | .......................... | 10 2011 012 436 |

(51) Int. Cl.
*E04C 3/30* (2006.01)
*E04C 3/00* (2006.01)
(Continued)

(52) U.S. Cl.
CPC .............. *B21D 5/16* (2013.01); *Y10T 29/49956* (2015.01); *Y10T 29/49963* (2015.01);
(Continued)

(58) Field of Classification Search
CPC ........... E04F 13/12; H02B 1/28; H02B 1/301; H02B 1/013; B21D 5/16; E04C 2/00; E04C 2/08; B23P 19/60

USPC ............................... 52/578; 29/469.5, 525.06
See application file for complete search history.

(56) References Cited

U.S. PATENT DOCUMENTS 2,446,336 A    8/1948    Mark et al.
4,198,795 A *  4/1980    Barnidge ........................ 52/180
(Continued)

FOREIGN PATENT DOCUMENTS

CN    201752064 U    2/2011
DE     1936096 A1    6/1970
(Continued)

OTHER PUBLICATIONS

International Search Report issued in corresponding application No. PCT/EP2012/000769 mailed Jul. 3, 2012.
(Continued)

*Primary Examiner* — Mark Wendell
(74) *Attorney, Agent, or Firm* — Carter DeLuca Farrell & Schmidt, LLP

(57) ABSTRACT

The present disclosure relates to a method for producing rectangular or square wall elements from flat sheet metal, including determining a length and width of a wall element, providing a flat sheet metal piece incising two longitudinal edge portions to form two incisions to form two tabs for each longitudinal edge portion separated by a respective incision from the remaining longitudinal edge portion, right-angled folding of a respective strip, formed by the incisions, right-angled folding of the tabs parallel to the longitudinal edge at the level of the base of the associated incision, right-angled folding of the longitudinal edge portions along the longitudinal edge, right-angled folding of the transverse edge portions parallel to the transverse edge to form a strip having a width corresponding to the transverse dimension of the tabs, and right-angled folding of the transverse edge portions along the transverse edge.

16 Claims, 7 Drawing Sheets

Figure 1:
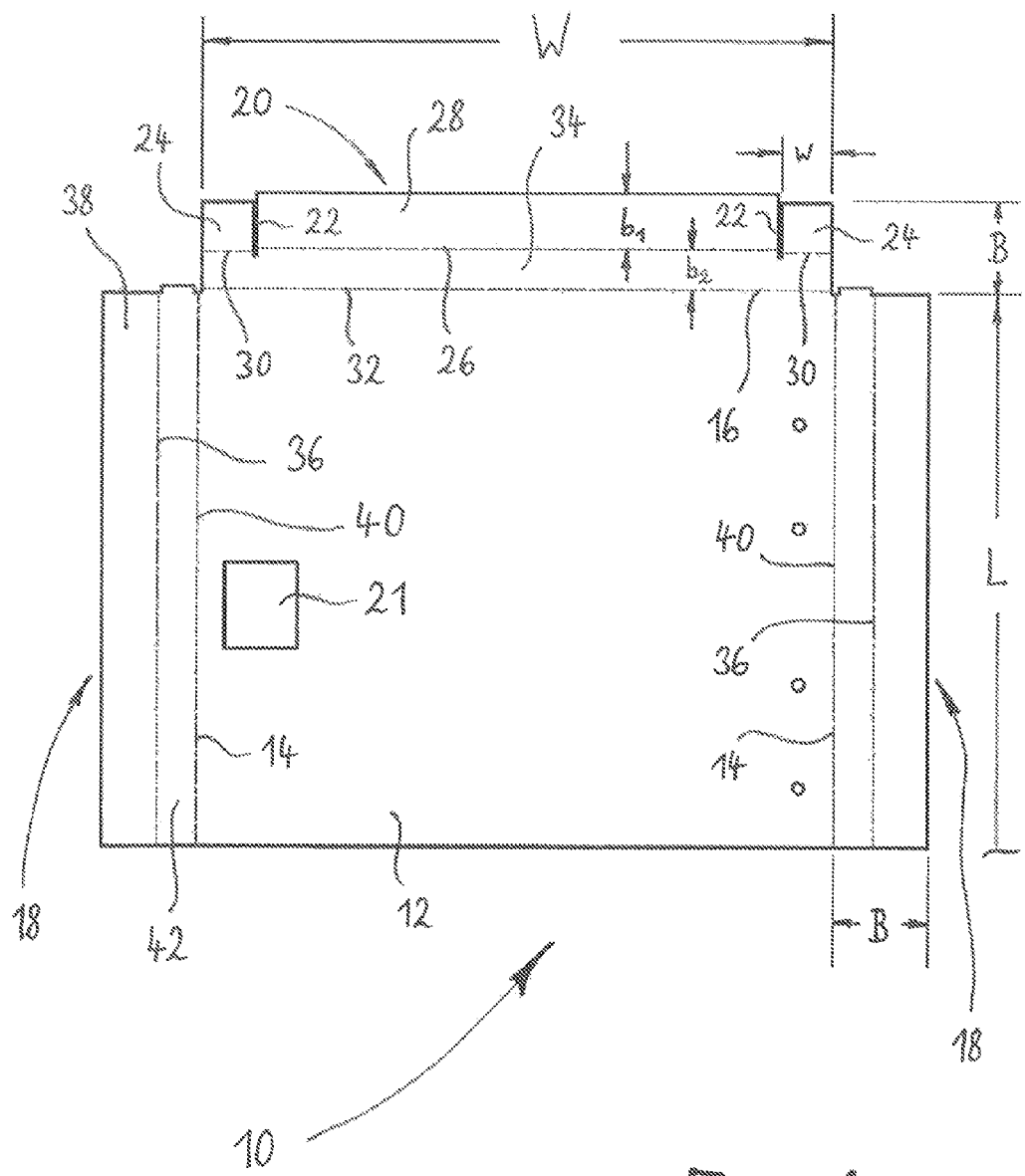

(51) Int. Cl.
  *B21D 5/16* (2006.01)
  *E04C 2/08* (2006.01)
  *E04F 13/12* (2006.01)
  *H02B 1/28* (2006.01)
  *H02B 1/30* (2006.01)
  *B23P 19/00* (2006.01)
  *E04C 2/00* (2006.01)
  *H02B 1/01* (2006.01)

(52) U.S. Cl.
  CPC ..... *Y10T 29/49968* (2015.01); *Y10T 29/49906* (2015.01); *Y10T 29/49995* (2015.01); *E04C 2/08* (2013.01); *E04F 13/12* (2013.01); *H02B 1/013* (2013.01); *H02B 1/28* (2013.01); *H02B 1/301* (2013.01); *B23P 19/00* (2013.01); *E04C 2/00* (2013.01)

(56) References Cited

U.S. PATENT DOCUMENTS

| | | |
|---|---|---|
| 5,008,485 A | 4/1991 | Kitagawa |
| 5,202,818 A | 4/1993 | Betsch et al. |
| 5,321,928 A | 6/1994 | Warneke |
| 5,775,051 A | 7/1998 | Nicolai et al. |
| 6,231,142 B1 | 5/2001 | Pochet |
| 6,561,555 B1 | 5/2003 | Millard |
| 7,267,378 B2 | 9/2007 | Drumm |
| 2006/0150480 A1* | 7/2006 | Ruller .............. 47/33 |
| 2009/0260311 A1 | 10/2009 | Boyer et al. |
| 2010/0000157 A1 | 1/2010 | Cotlet et al. |
| 2011/0272895 A1 | 11/2011 | Kritzer et al. |

FOREIGN PATENT DOCUMENTS

| | | |
|---|---|---|
| DE | 19528362 A1 | 2/1996 |
| DE | 295 17 327 U1 | 3/1997 |
| DE | 198 53 611 C1 | 4/2000 |
| DE | 102008020148 A1 | 10/2008 |
| EP | 0330758 A1 | 9/1989 |
| EP | 1659250 A1 | 5/2006 |
| WO | 91/05925 A1 | 5/1991 |
| WO | 2005052416 A1 | 6/2005 |

OTHER PUBLICATIONS

International Search Report issued in corresponding application No. PCT/EP2013/000768 mailed Jun. 28, 2012.

International Search Report issued in corresponding application No. PCT/EP2012/000766, mailed Aug. 8, 2012.

Chinese Office Action, Application No. 201280010532.2 dated Dec. 17, 2014.

* cited by examiner

METHOD FOR PRODUCING RECTANGULAR OR SQUARE WALL ELEMENTS FROM FLAT SHEET METAL, AND WALL ELEMENTS PRODUCED THEREWITH

The present invention relates to a method for producing rectangular or square wall elements from flat sheet metal and to wall elements produced therewith.

Wall elements made of flat sheet metal have been known for a long time. They are employed, for example, as outer walls of housings and cabinets, in particular in tool cabinets, switchgear cabinets and the like, but also in electrical appliances such as, for example, refrigerators, washing machines, chest freezers. Wall elements made of flat sheet metal are also used in the area of buildings, for example as covering elements of industrial buildings. In the context of the present description, wall elements are to be understood in particular also as door elements or complete doors made of flat sheet metal, as may be used e.g. in all kinds of steel cabinets.

Wall elements made of flat sheet metal of the kind mentioned can be produced inexpensively, but owing to the relatively thin sheet metal used for their production they have only a low torsional rigidity. This lack of torsional rigidity is particularly disadvantageous when the wall element is a door element, since a door of low torsional rigidity not only feels unstable, but also affords poor conditions for perfect sealing along its circumference. It is possible to give wall elements made of flat sheet metal a greater torsional rigidity by means of separate reinforcements, for example by two bars preferably fastened to the inner side of the wall element and each extending from one corner of the wall element to the diagonally opposite corner, or—especially in the case of doors—by a separate peripheral frame formed from tubes which reinforces the edge of a door, but such reinforcing elements increase the weight of the wall element and the production costs, since such reinforcing elements have to be fabricated separately and connected to the wall element.

The object on which the invention is based is to provide a wall element made of flat sheet metal and a method for its production which, while being simple to produce and of low weight, has an increased torsional rigidity compared with conventional wall elements of the kind mentioned.

This object is achieved according to the invention by a method which comprises the steps specified in Claim 1 or in Claim 2, and by a wall element having the features specified in Claim 8.

To carry out the method according to the invention, firstly there is determined a length and a width which a desired wall element is to have after its completion. Then, a flat sheet metal piece made of flat sheet metal material having a desired material thickness is provided, which piece has two longitudinal edges and two transverse edges running at right angles to the longitudinal edges and projects by a predetermined extent along each longitudinal edge and each transverse edge in order to form two mutually opposite longitudinal edge portions and two mutually opposite transverse edge portions having a predetermined edge width. The short lateral edges of the longitudinal edge portions and of the transverse edge portions have the dimension of the predetermined edge width, whereas the inner long lateral edges of the longitudinal edge portions have the determined length and the inner lateral edges of the transverse edge portions have the initially determined width.

The two longitudinal edge portions are incised close to each of their short lateral edges parallel to the transverse edge along a section which is smaller than the edge width so as thus to form two tabs for each longitudinal edge portion which are separated by a respective incision from the remaining longitudinal edge portion and have a transverse dimension running parallel to the long lateral edge of the longitudinal edge portion. The incision length of the incision corresponds to the incised section. Between the two tabs of a longitudinal edge portion, a strip running parallel to the longitudinal edge is formed by the two incisions. These strips of each longitudinal edge portion are now folded parallel to the longitudinal edge at right angles in the same direction in such a way that each folded strip has a width which corresponds at most to the incision length less the material thickness. In other words, the folding line running parallel to the inner longitudinal edge of the longitudinal edge portion runs at a distance from the associated free, outer longitudinal edge of the longitudinal edge portion which corresponds at most to the incision length minus the material thickness of the flat sheet metal material, i.e. is always smaller by at least the material thickness than the incision length. The purpose of this procedure will become clearer from the explanations below.

Then, the two tabs produced by the incisions in each longitudinal edge portion are folded parallel to the inner longitudinal edge of the associated longitudinal edge portion at right angles in the same direction in which the strip of the longitudinal edge portion has been previously folded. The folding line of the tabs runs at the level of the base of the associated incisions. In other words, the folding line for the tabs lies by at least the extent of the material thickness closer to the inner longitudinal edge of the longitudinal edge portion than the folding line for the strip.

Now, both longitudinal edge portions are again folded at right angles, to be precise along a folding line formed by the inner longitudinal edge of the longitudinal edge portion and in the same direction as the tabs and the strips previously. Owing to the double right-angled folding of each longitudinal edge portion, the tabs and the strips now run parallel again to the remaining flat sheet metal material which has not been folded, but in a plane spaced therefrom.

Now the transverse edge portions are also folded twice at right angles, the first right-angled folding of the transverse edge portions taking place along a folding line which runs parallel to the inner long lateral edge of the transverse edge portion and having a spacing from it which is dimensioned such that after the folding operation there results a respective outer strip which is folded at right angles and the width of which corresponds to the transverse dimension of the tabs. The second right-angled folding of the transverse edge portions takes place along a folding line which is formed by the inner long lateral edge of the transverse edge portion, which corresponds to the initially determined transverse edge of the wall element. The two folding operations of the transverse edge portions take place in the same direction as the folding operations carried out previously on the longitudinal edge portions. The double right-angled folding of the transverse edge portions accordingly has the result that the outer strips of the transverse edge portions likewise run parallel to the material of the flat sheet metal piece which has not been folded and come to bear on the tabs of the longitudinal edge portions. The distance of the tabs and of the strip of the longitudinal edge portions from the plane of the flat sheet metal material which has not been folded is dimensioned such that the tabs lie by at least the material thickness of the flat sheet metal material lower than the strips, i.e. are situated by at least the thickness of the flat sheet metal material closer to the plane of the flat sheet metal material which has not been folded. The strips of the transverse edge portions which come to bear on the tabs and have the same material thickness as the rest of the flat sheet metal material are thus arranged in a plane in which also the outer strips of the longitudinal edge portions are arranged. The strips of the longitudinal edge portions and the strips of the transverse edge portions thus butt flush against one another or, even if they do not butt against one another, at least form a flush surface, i.e. a surface situated at one and the same level.

The method according to the invention carried out as described results in a wall element which, in its edge region along its whole circumference, has a U-shaped edge profile which considerably increases the stability of the wall element, in particular its torsional rigidity, without however increasing the weight and without using separate reinforcing elements. The inner edge, formed by the strips of the longitudinal edge portions and transverse edge portions, of the wall element is arranged as described in one and the same plane and therefore affords ideal conditions for applying a circumferential seal. The tabs formed by the incisions serve as a supporting bearing for the strips of the transverse edge portions, while the edges of the transverse edge portions and of the longitudinal edge portions are able to be supported against one another owing to their positioning in one and the same plane, with the result that only a small amount of twisting of the wall element is still possible at all.

It will be understood that the incisions may also be produced on the transverse edge portions instead of on the longitudinal edge portions. Accordingly, both transverse edge portions are then provided with two respective tabs which are bent at right angles, analogously to the previously described procedure, such that they are arranged by approximately the material thickness of the flat sheet metal material below the outer strips of the transverse edge portions. By double right-angled bending of the longitudinal edge portions, the outer strips of the longitudinal edge portions then bear on the tabs of the transverse edge portions. In the case of a square wall element, it is no longer possible anyway to distinguish between longitudinal edge portions and transverse edge portions, since both have the same dimensions.

To further increase the torsional rigidity, it is possible in a further step for the tabs formed by the incisions to be firmly connected to the region of the transverse or longitudinal edge portion arranged upon them. This connecting does not have to be effected on all the tabs; even one tab thus fixed markedly increases the torsional rigidity, and this effect is intensified for each further connected tab. Preferably, the step of connecting the tab to the region of the transverse or longitudinal edge portion arranged upon it is effected by adhesive bonding, welding, riveting, clinching or screwing. The welding is preferably a spot welding.

According to a development of the method according to the invention, a hole grid is produced along at least the outer strips of the longitudinal edge portions or the transverse edge portions. Such a hole grid preferably has a grid dimension of 25 mm and may be used, for example, to securely fasten various fittings to the wall element made of flat sheet metal.

A wall element according to the invention is made of flat sheet metal material having a desired, generally uniform material thickness and has a rectangular or square main surface which determines two longitudinal edges and two transverse edges. The flat sheet metal material is folded inwards at right angles in each case twice, parallel to each longitudinal edge and each transverse edge, in order to form edge regions having a U-shaped edge cross-section. The flat sheet metal material is in one piece and has free limbs, projecting inwards parallel to the main surface, of edge regions of the longitudinal edges and of the transverse edges. The free limbs either of the transverse edges or of the longitudinal edges have lateral end portions which are formed by a respective tab which extends parallel to the associated limb in a plane arranged closer to the main surface by at least the material thickness of the flat sheet metal material. The lateral end portions of the free limbs not having tabs overlap the tabs. Preferably, this overlapping is complete, i.e. the lateral end portions of the free limbs not having tabs completely cover the tabs.

As already explained previously, in preferred embodiments the lateral end portions of the free limbs not having tabs are firmly connected, e.g. adhesively bonded, welded, riveted or screwed to the tabs or connected to them by clinching to one another.

Advantageously, along the free limbs a respective row of holes is present, the holes preferably being arranged in accordance with a grid dimension.

Figure 2:
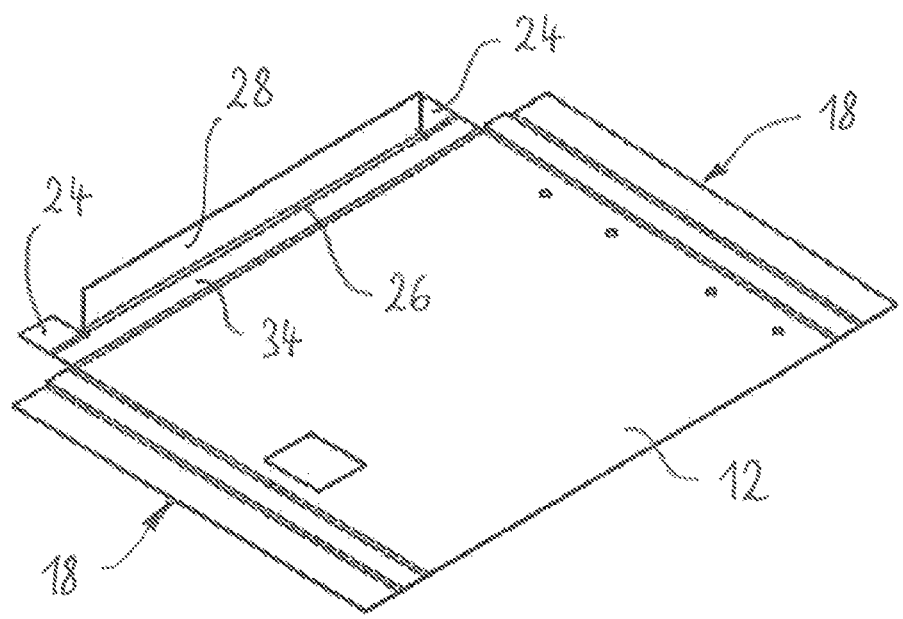
Figure 3:
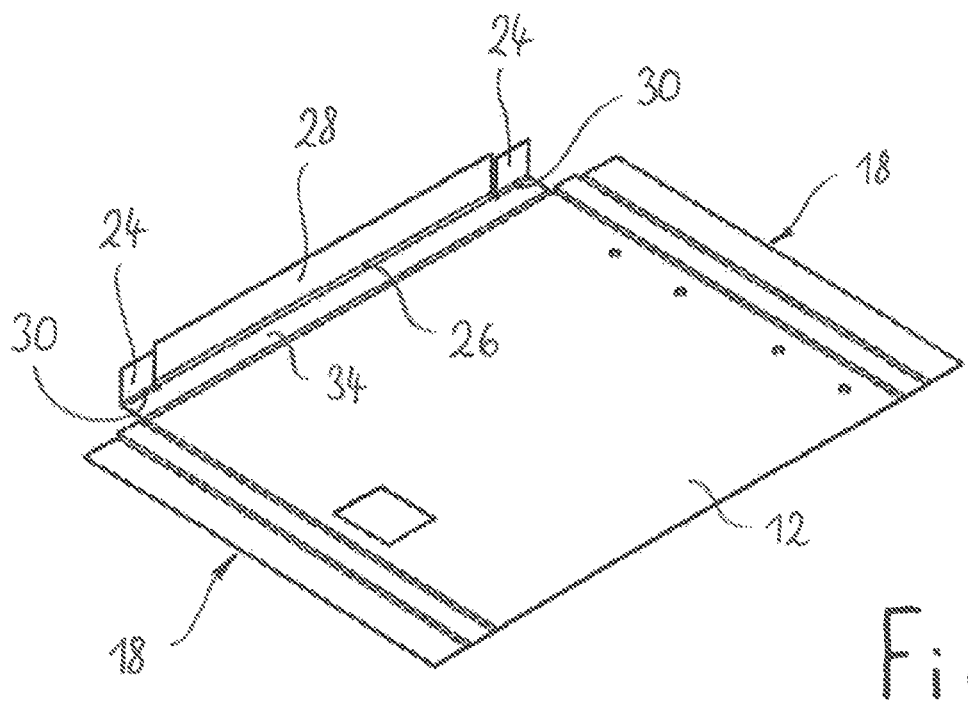
Figure 4:
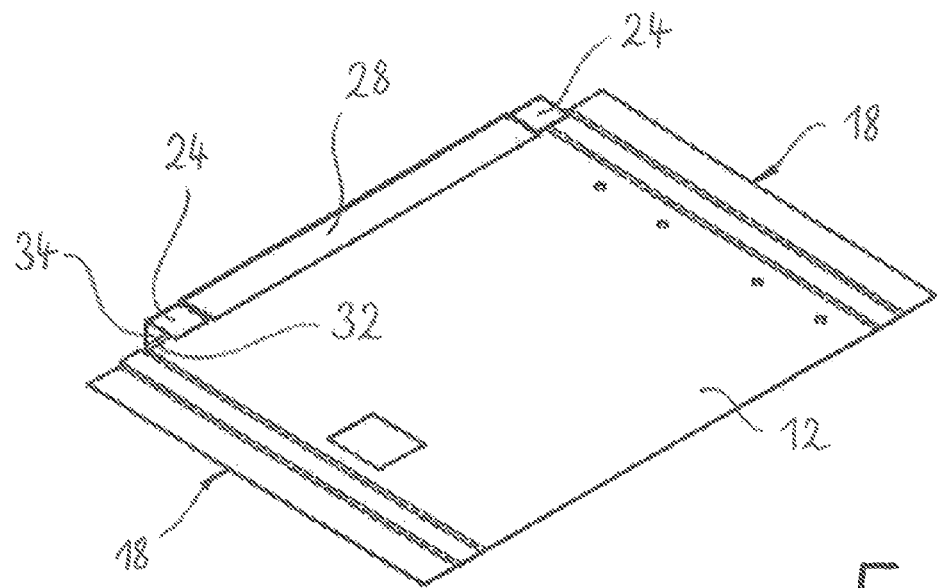
Figure 5:
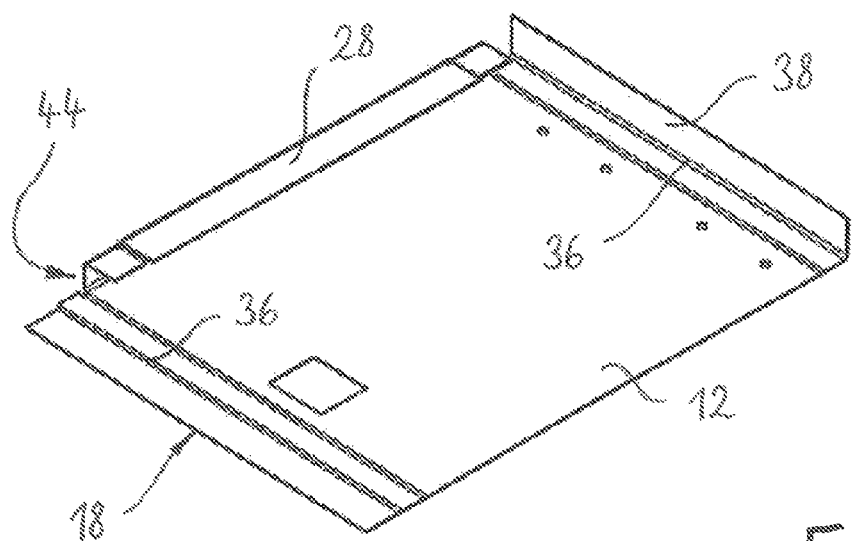
Figure 6:
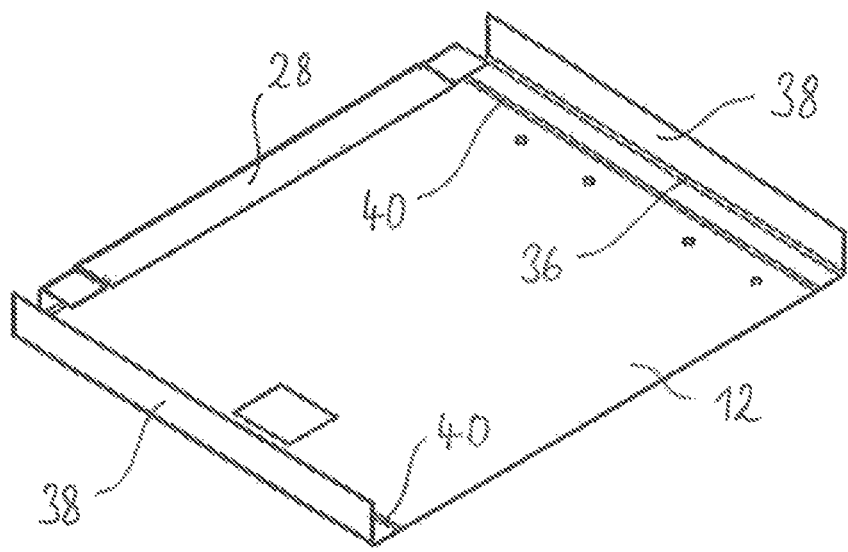
Figure 7:
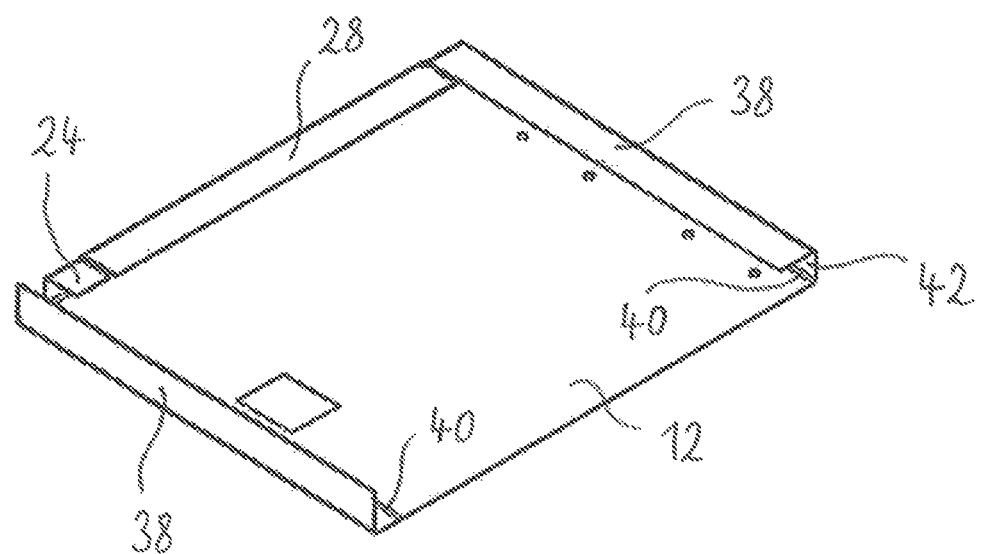
Figure 8:
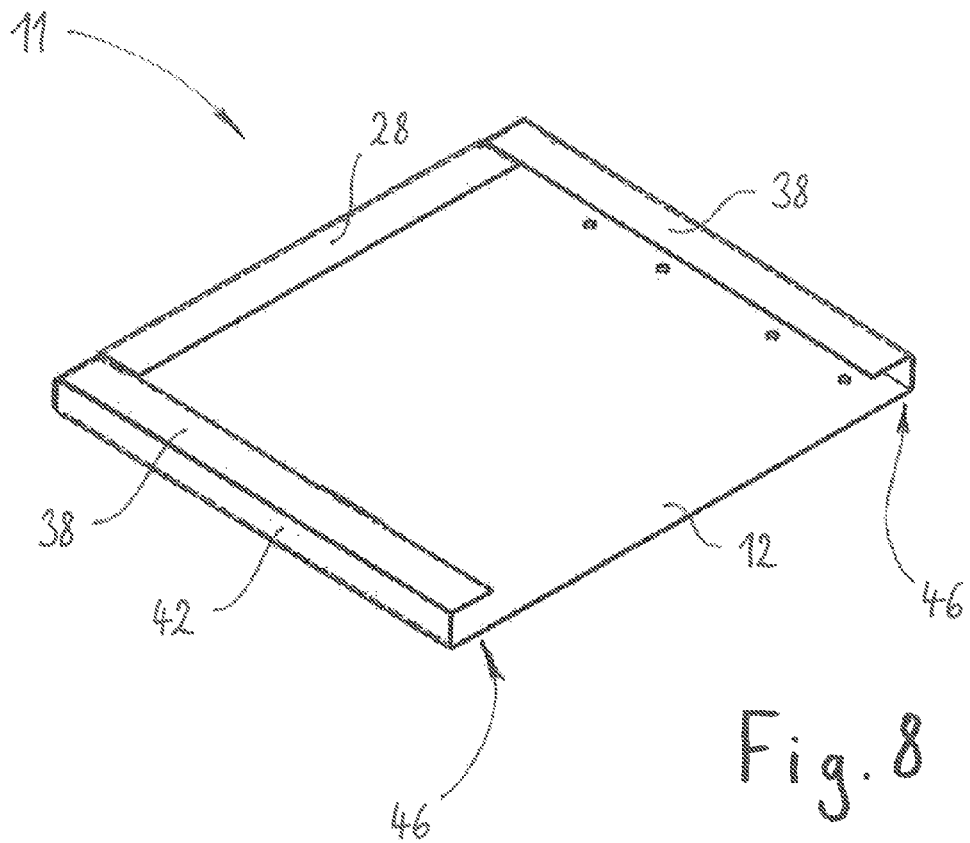
Figure 9:
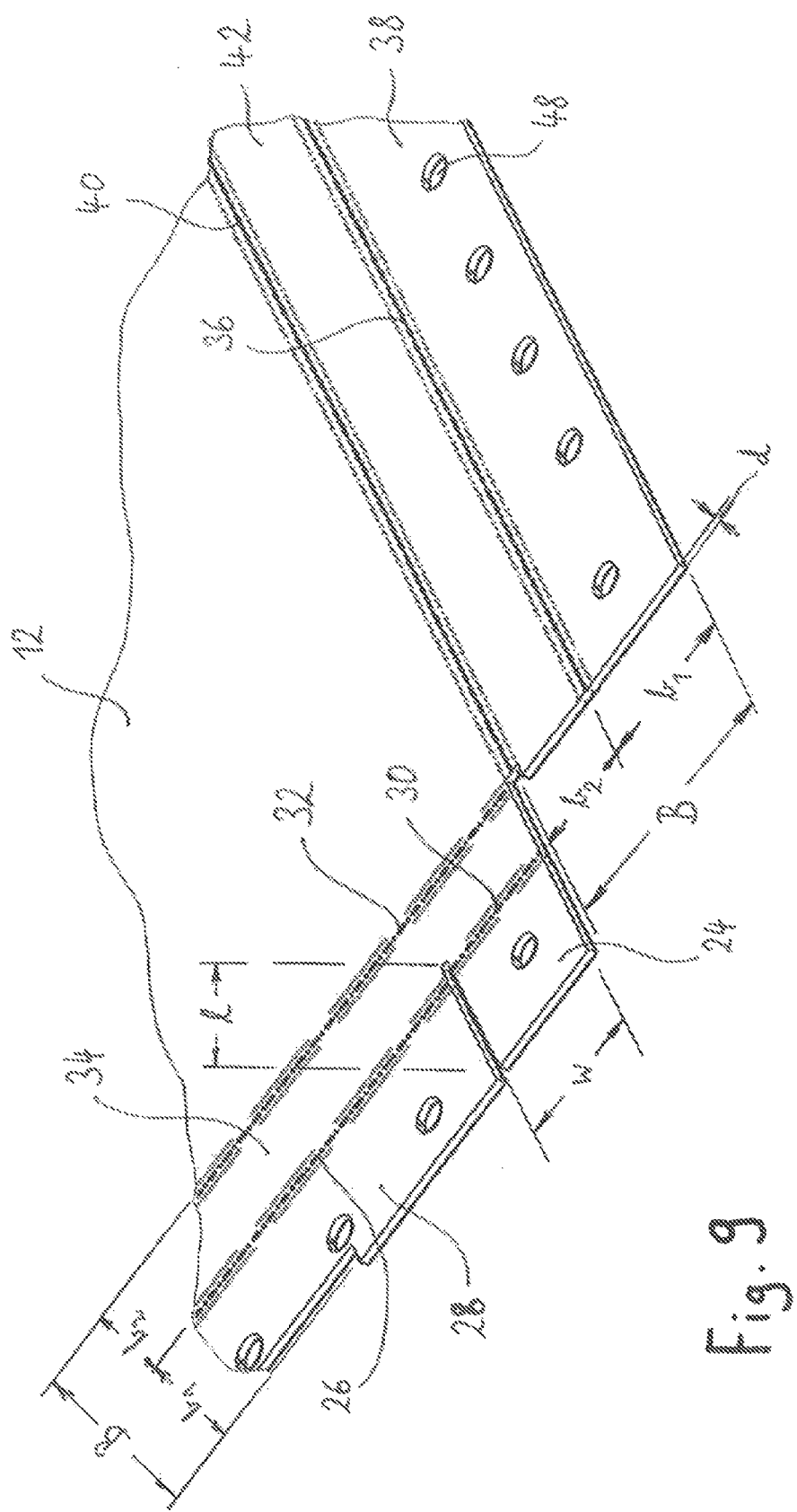
Figure 10:
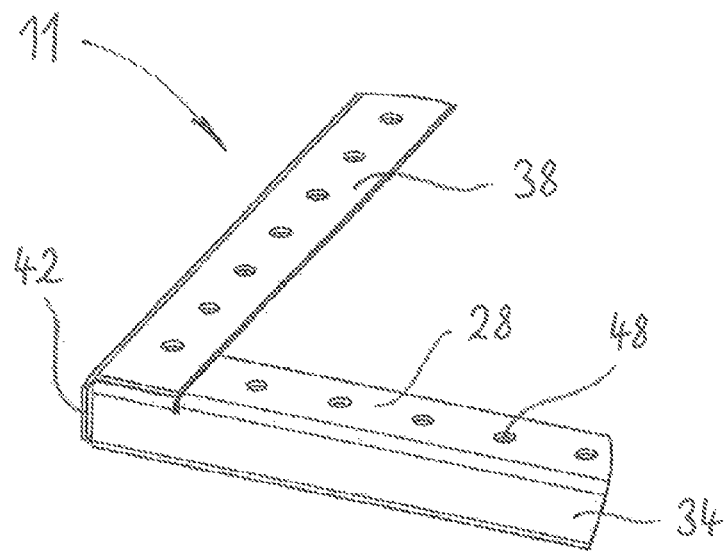
Figure 11:
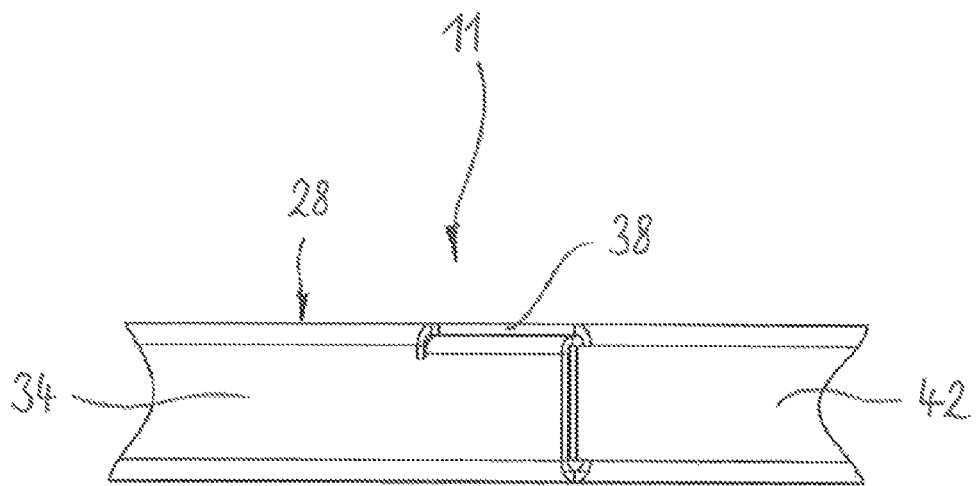

An embodiment of the method according to the invention and of a wall element produced therewith is explained in more detail below with the aid of the appended, schematic drawings, in which:

FIG. 1 shows a plan view of a flat sheet metal piece prepared for use in a method according to the invention, FIG. 2 shows a plan view obliquely from above of the flat sheet metal piece from FIG. 1 after a first folding step, FIG. 3 shows the view from FIG. 2 after a second folding step has been carried out, FIG. 4 shows the view from FIG. 2 after a third folding step has been carried out, FIG. 5 shows the view from FIG. 2 after a fourth folding step has been carried out, FIG. 6 shows the view from FIG. 2 after a fifth folding step has been carried out, FIG. 7 shows the view from FIG. 2 after a sixth folding step has been carried out, FIG. 8 shows the view from FIG. 2 after a seventh folding step has been carried out, FIG. 9 shows a plan view obliquely from above of a corner region of the flat sheet metal piece from FIG. 1, FIG. 10 shows a three-dimensional illustration of the corner region from FIG. 9 after all the folding steps have been carried out, and FIG. 11 shows a further three-dimensional view of the corner region from FIG. 10 in the finished form.

FIG. 1 shows in plan view a planar flat sheet metal piece made of sheet steel, which is designated generally by 10 and has over its entire extent a uniform material thickness d (see FIG. 9). The flat sheet metal piece 10 has a main surface 12 which determines two longitudinal edges 14 and two transverse edges 16, of which only one transverse edge 16 can be seen in FIG. 1, since FIG. 1 shows only half of the whole flat sheet metal piece 10. Each longitudinal edge 14 has a length L and each transverse edge 16 has a width W, the length L and the width W being those dimensions which a wall element 11 produced from the flat sheet metal piece 10 is to have later.

At each longitudinal edge 14, the flat sheet metal material of the flat sheet metal piece 10 projects beyond the main surface 12 in order to form a respective longitudinal edge portion 18 having the length L and an edge width B. Analogously, the flat sheet metal material at each transverse edge 16 projects from the main surface 12 in order to form a respective transverse edge portion 20 having a length corresponding to the width W and having the edge width B. The longitudinal edge portions 18 and the transverse edge portions 20, only one of which is illustrated in FIG. 1, are integrally connected to the flat sheet metal piece 10 and at first lie in the same plane as the main surface 12. In the main surface 12, a rectangular cutout 21 is produced, for example by means of water jet cutting or laser cutting, which cutout can later serve for receiving a door lock (not shown) or the like. This cutout 21 is optional and may of course also be omitted.

A uniform material thickness d is not a requirement for carrying out the method described; in fact, the flat sheet metal piece 10 may have a different material thickness in certain regions. For example, for reasons of stability, the longitudinal edge portions 18 and the transverse edge portions 20 may have a greater material thickness than the main surface 12. On the other hand, if desired, the main surface 12 may have a greater material thickness than the longitudinal edge portions 18 and the transverse edge portions 20, since the latter acquire a greater stability to torsion anyway in the course of the method described, as a result of folding operations.

As can be clearly seen from FIG. 1 and FIG. 9, in the embodiment shown, each transverse edge portion 20 is provided with two incisions 22 which run parallel to the longitudinal edge 14 (and thus in the embodiment illustrated also parallel to the short lateral edge of the transverse edge portion 20) and have an incision length l. Two tabs 24 having a width, i.e. a transverse dimension w, are formed in each transverse edge portion 20 adjacently to the respective outer lateral edge by these two incisions 22. The tabs 24 accordingly have a length l and a width w.

In FIGS. 1 and 9 on the flat sheet metal piece 10 there can be seen several chain lines representing folding lines, along which the flat sheet metal piece 10 is folded in several steps as described below.

A first folding line 26 runs on the or each transverse edge portion 20 parallel to the transverse edge 16 from one incision 22 to the other incision 22. A strip 28 having a width $b_1$ is formed between the two incisions 22 by the first folding line 26.

A second folding line 30 runs likewise parallel to the transverse edge 16 transversely across each tab 24, to be more precise from the base of each incision to the adjacent short lateral edge of the transverse edge portion 20. For reasons which will become more readily apparent later, each second folding line 30 is arranged by at least the extent of the material thickness d closer to the transverse edge 16 than the first folding line 26.

A third folding line 32 runs over the whole length of the transverse edge 16. A strip 34 having a width $b_2$ is thus formed between the first folding line 26 and the third folding line 32.

A fourth folding line 36 runs on each longitudinal edge portion 18 parallel to the longitudinal edge 14 and forms a strip 38 of width $b_1$ on each longitudinal edge to portion 18.

A fifth and last folding line 40 runs at the inner long lateral edge of each longitudinal edge portion 18 over the whole length of the assigned longitudinal edge 14 of the main surface 12. A strip 42 of width $b_2$ is formed on each longitudinal edge portion 18 between the fifth folding line 40 and the fourth folding line 36.

With particular reference to FIGS. 2 to 8, the various folding operations will now be explained. Firstly, the flat sheet metal piece 10 is folded upwards at right angles along the first folding line 26, as illustrated in FIG. 2. In other words, the strip 28 of the transverse edge portion 20 is set up at right angles from the plane of the main surface 12.

Then, see FIG. 3, the two tabs 24 are likewise set up at right angles by folding them upwards at right angles each along the second folding line 30. Subsequently, the whole transverse edge portion 20 is again folded upwards at right angles along the third folding line 32 (see FIG. 4), which has the result that the strip 34 of the transverse edge portion 20 is now arranged at right angles to the main surface 12, while the strip 28 and the two tabs 24 are situated in planes parallel to the main surface 12 (both tabs 24 are situated in one and the same plane). A respective edge region 44 with a U-shaped cross-section has thus resulted along the transverse edge 16 by the double right-angled folding of the transverse edge portions 20.

Now, each longitudinal edge portion 18 is firstly folded upwards at right angles along the fourth folding line 36, i.e. the strips 38 of the longitudinal edge portions 18 are set up at right angles from the plane of the main surface 12 (see FIGS. 5 and 6).

In a last folding operation, the longitudinal edge portions 18 are each again folded upwards at right angles (see FIGS. 7 and 8), so that edge regions 46 with a U-shaped cross-section are also formed along the longitudinal edges 14.

Because the two folding lines 30 are arranged by the extent of the material thickness d of the flat sheet metal material closer to the transverse edge 16 than the first folding line 26, in the finished folded state of the transverse edge portion 20 the two tabs 24 lie in a plane which is at least substantially parallel to the main surface 12 and which is situated by the extent of the material thickness d closer to the plane of the main surface 12 than that plane in which the strip 28 is situated. Starting from the level of the strip 28, the tabs 24 thus lie by approximately the extent of the material thickness d lower than the strip 28. On the second folding of the longitudinal edge portions 18, the strips 38 of the longitudinal edge portions 18 are thus laid over the tabs 24 and form with the strips 28 of the transverse edge portions 20 a flush inner circumferential surface, on which for example a seal (not illustrated here) can be mounted. Because the strips 34 of the transverse edge portions 20 and the strips 42 of the longitudinal edge portions 18 have the same width $b_2$, the strips 28 and 38 lie in one and the same plane after the respective double folding of the transverse edge portions and of the longitudinal edge portions (see in particular FIG. 11). The tabs 24 serve here as bearings for the corresponding regions of the strips 38 of the longitudinal edge portions 18.

To further increase the torsional stability of a wall element 11 produced with the method described, those regions of the strips 38 which bear on the tabs 24 can be firmly connected to the tabs 24. Such a firm connection can be achieved by adhesive bonding, welding (in particular spot welding), screwing or by clinching. If such a firm connection is performed at all four corners of a wall element, an extremely torsionally rigid wall element 11 is obtained owing to the resulting fixing and owing to the U-shaped cross-sectional form of the edge regions 44 and 46.

As illustrated in FIGS. 9 and 10, holes 48 may be present along the outer edges of the longitudinal edge portions 18 and transverse edge portions 20, which holes are preferably arranged with a specific grid dimension, for example with a spacing of 25 mm. After the respective double folding of the longitudinal edge portions 18 and transverse edge portions 20, these holes 48 are then situated on the inner side of the wall element (see FIG. 10) and can serve as fastening points for all kinds of fittings and attachments which are to be fastened to the wall element 11.

In the above-described embodiment of the method for producing a wall element from flat sheet metal material, the incisions 22 are made in the transverse edge portion 20. It will be understood, however, that these incisions may instead also be made on the longitudinal edge portions 18. The tabs 24 are then a constituent part of the longitudinal edge portions 18 and the strips 28 of the transverse edge portions 20 then overlap the tabs 24 after double folding of the transverse edge portions.

The invention claimed is:

1. A method for producing rectangular or square wall elements from flat sheet metal, comprising:
   determining a length and width of a wall element;
   providing a flat sheet metal piece made of flat sheet metal material having a material thickness, which piece has two longitudinal edges of the determined length and two transverse edges of the determined width and projects by a predetermined extent along each longitudinal edge and transverse edge in order to form two mutually opposite longitudinal edge portions and two mutually opposite transverse edge portions having a predetermined edge width, the longitudinal edge portions and the transverse edge portions each having a short lateral edge having a dimension of the edge width;
   incising the two longitudinal edge portions parallel to the transverse edge in order to form two incisions having an incision length which is smaller than the edge width so as to form two tabs for each longitudinal edge portion which are separated by a respective incision from the remaining longitudinal edge portion and have a transverse dimension;
   right-angled folding of a respective strip, formed by the incisions, of the remaining longitudinal edge portion parallel to the longitudinal edge, the strip having a width which corresponds at most to the incision length less the material thickness;
   right-angled folding of the tabs parallel to the longitudinal edge at a level of a base of the associated incision;
   right-angled folding of the longitudinal edge portions along the longitudinal edge;
   right-angled folding of the transverse edge portions parallel to the transverse edge to form a strip having a width corresponding to a transverse dimension of the tabs; and
   right-angled folding of the transverse edge portions along the transverse edge.

2. The method according to claim 1, further comprising connecting at least one tab to a region of the transverse or longitudinal edge portion arranged upon the at least one tab.

3. The method according to claim 2, wherein the step of connecting is effected by adhesive bonding, welding, riveting, clinching or screwing.

4. The method according to claim 2, wherein the step of connecting is effected by spot welding.

5. The method according to claim 1, further comprising producing a hole grid along at least the strips of the longitudinal edge portions or the transverse edge portions.

6. The method according to claim 5, wherein the hole grid has a grid dimension of 25 mm.

7. A wall element made of flat sheet metal material of a material thickness, comprising:
   a rectangular or square main surface which determines two longitudinal edges and two transverse edges, the flat sheet metal material being monolithic and folded inwards at right angles twice, parallel to each longitudinal edge and each transverse edge, in order to form edge regions having a U-shaped edge cross-section; and
   free limbs, projecting inwards parallel to the main surface, of edge regions of the longitudinal edges or of edge regions of the transverse edges have lateral end portions which are formed by a respective tab which extends parallel to the associated limb in a plane arranged by at least the material thickness of the flat sheet metal material closer to the main surface, wherein lateral end portions of the free limbs, not having tabs, of edge regions of the transverse edges or of edge regions of the longitudinal edges overlap the tabs.

8. The wall element according to claim 7, wherein the lateral end portions of the free limbs not having tabs completely overlap the tabs.

9. The wall element according to claim 7, wherein the lateral end portions of the free limbs not having tabs are adhesively bonded, welded, riveted or screwed to the tabs or connected to them by clinching to one another.

10. The wall element according to claim 7, wherein along the free limbs a respective row of holes is present, the holes being arranged in accordance with a grid dimension.

11. A method for producing rectangular or square wall elements from flat sheet metal, comprising:
    determining a length and width of a wall element;
    providing a flat sheet metal piece made of flat sheet metal material having a material thickness, which piece has two longitudinal edges of the determined length and two transverse edges of the determined width and projects by a predetermined extent along each longitudinal edge and transverse edge in order to form two mutually opposite longitudinal edge portions and two mutually opposite transverse edge portions having a predetermined edge width, the longitudinal edge portions and of the transverse edge portions each having a short lateral edge having the dimension of the edge width;
    incising the two transverse edge portions parallel to the longitudinal edge in order to form two incisions having an incision length which is smaller than the edge width so as to form two tabs for each transverse edge portion which are separated by a respective incision from the remaining transverse edge portion and have a transverse dimension;
    right-angled folding of a respective strip, formed by the incisions, of the remaining transverse edge portion parallel to the transverse edge, the strip having a width which corresponds at most to the incision length less the material thickness;
    right-angled folding of the tabs parallel to the transverse edge at a level of a base of the associated incision;
    right-angled folding of the transverse edge portions along the transverse edge;
    right-angled folding of the longitudinal edge portions parallel to the longitudinal edge to form a strip having a width corresponding to a transverse dimension of the tabs; and
    right-angled folding of the longitudinal edge portions along the longitudinal edge.

12. The method according to claim 11, further comprising connecting at least one tab to the region of the transverse or longitudinal edge portion arranged upon it.

13. The method according to claim 12, wherein the step of connecting is effected by adhesive bonding, welding, riveting, clinching or screwing.

14. The method according to claim 12, wherein the step of connecting is effected by spot welding.

15. The method according to claim 11, further comprising producing a hole grid along at least the strips of the longitudinal edge portions or the transverse edge portions.

16. The method according to claim 15, wherein the hole grid has a grid dimension of 25 mm.

* * * * *